Oct. 6, 1931.   R. H. MUELLER   1,826,322
BALL COCK
Filed Feb. 11, 1929
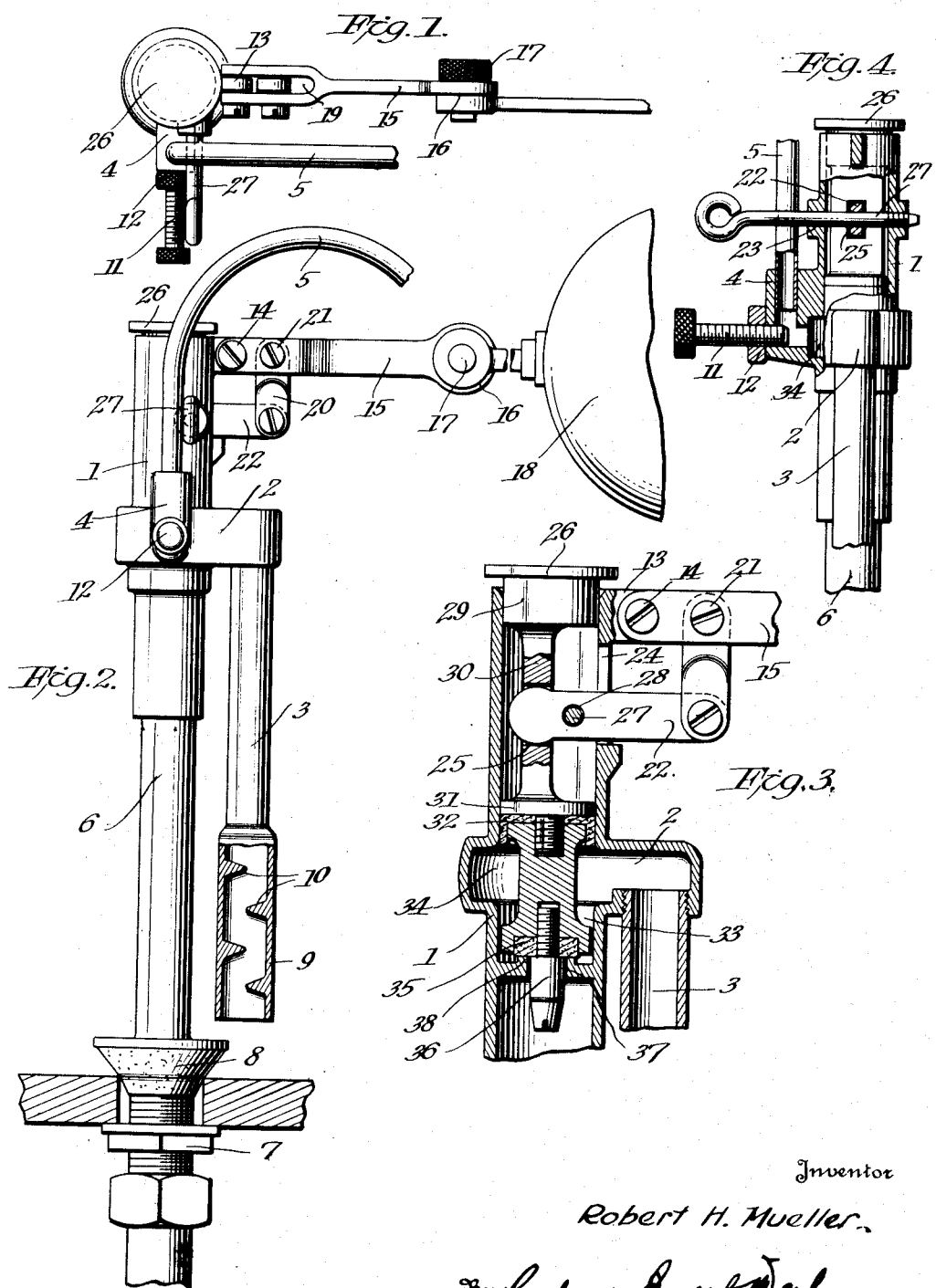
Inventor
Robert H. Mueller,
By Cushman, Bryant Darby
Attorneys Patented Oct. 6, 1931

1,826,322

UNITED STATES PATENT OFFICE

ROBERT H. MUELLER, OF DECATUR, ILLINOIS, ASSIGNOR TO MUELLER CO., OF DECATUR, ILLINOIS, A CORPORATION OF ILLINOIS

BALL COCK

Application filed February 11, 1929. Serial No. 339,198.

This invention relates to float valves of the ball cock type.

An object of the invention is to provide a valve of the type described, which in operation opens and closes quickly.

Another object of the invention is to provide a construction which will render the valve relatively noiseless when in use.

Another object of the invention is to provide a valve, the working parts of which are easily accessible and removable for repair or renewal.

Still another object of the invention is to provide a valve economical in manufacture, and with installation advantages to meet the precise desires prevalent among those skilled in the art.

In the drawings:

Figure 1 is a plan view.

Figure 2 is a side view.

Figure 3 is a vertical cross section of the valve in closed position on a slightly larger scale.

Figure 4 is a view partly in cross section, taken at right angles to the view shown in Figure 3.

Referring specifically to the drawings, 1 represents the casing of the valve proper, comprising a cylindrical portion to receive the valve plunger, and an enlarged chamber with a longitudinal extension or discharge chamber 2 to receive the discharge pipe 3, and a longitudinal and vertical extension 4 to receive the after-fill tube 5.

Screw threaded, or otherwise suitably secured to the valve casing 1 is a pipe 6 with a downwardly extending screw threaded shank upon which is screwed a nut 7 to clamp the valve in position in the tank. A cone-shaped rubber washer 8 is placed between the flange of the valve body and the floor of the tank to give a water-tight joint. The connection with the water pipe is made by any suitable means.

The discharge pipe 3 is screwed into the longitudinal extension 2, and at the lower extremity thereof, is an enlargement 9 within which are integral lugs 10 to serve as baffles for silencing the flow of water. The after-fill tube 5 is screwed into the longitudinal and vertical extension 4, and is provided with a regulating device to control the flow of water therethrough, which comprises a screw 11 with the usual stop washer 12 to restrict the passage from the enlarged chamber to the after-fill tube extension.

A lug 13 projects from the upper cylindrical portion of the valve upon which is pivoted at 14 a float rod 15. A joint 16 with a thumb screw 17 in the float rod permits the float ball 18 to be raised or lowered for adjustment. The float rod is bifurcated at 19. An arm 20 is pivoted at 21 within the bifurcation 19, and is, itself, bifurcated to receive an operating lever 22 pivoted at 23 which extends through the slot 24 in the valve body. The operating lever 22 is slightly flared at one end to fit within a slot 25 in a valve member 26.

A pin 27 extends through the valve body adjacent the slot 24, passing through the hole 28 in the operating lever. This pin forms the fulcrum upon which the lever 22 operates, and maintains the latter's engagement with the valve member.

The valve member 26 comprises an upper cylindrical guide portion 29, downwardly from which extends a valve stem 30 to a valve head 31. The valve stem 30 is offset or cut away to allow clearance space for the pin 27. A leather cup piston 32 is provided instead of the ordinary packing joint to insure against the escape of water. This may be renewed by removing the valve head from the valve stem. The valve head 31 is slidably mounted in a reduced chamber 33, above which is an enlarged chamber 34. A seat washer is provided at 35 and held by an elongated screw 36 which extends through a hole 37 in the valve seat 38, and provides a guiding means.

A distinct advantage of the assembly, is the compound type of lever arrangement which will maintain the valve in a closed position against high pressure.

Because of the reduced chamber 33, the volume of water flowing into the enlarged chamber 34 is restricted, which, together with the baffle arrangement in the discharge pipe, eliminates the "singing" noise common in ball cock valves, and renders the device practically noiseless.

By simply unscrewing and removing the pin 27, the operating lever 22 is free to be withdrawn from the slot 25 in the web 30, and the slot 24 in the valve body. Subsequently, the entire valve member can be withdrawn from the valve body. This allows easy accessibility for repairs and renewal of parts. Furthermore, the valve construction is such as to ensure steady valve operation, and ready separation of parts for repairs and replacements.

I claim:

1. A valve of the ball cock type having a valve casing, a lug attached thereto at the uppermost end, a bifurcated lever pivoted thereon, a second bifurcated lever pivoted within the bifurcation of the first lever, a third lever pivoted within the bifurcation of the second lever, the said third lever fulcrumed within the valve casing adjacent the valve stem to effect its operation.

2. A valve of the ball cock type having a valve casing, comprising an upper cylindrical chamber, a lower cylindrical chamber, and an intermediate enlarged chamber, a series of inter-connected levers attached to the upper cylindrical chamber and fulcrumed therein, a slotted valve stem movable within the upper cylindrical chamber, and a valve head connected to said valve stem.

3. A valve of the ball cock type having a valve casing comprising an upper cylindrical chamber, a lower cylindrical chamber and an intermediate enlarged chamber, a series of inter-connected levers attached to the upper cylindrical chamber and fulcrumed therein, a slotted valve stem movable within the upper cylindrical chamber and detachably secured to said inter-connected levers, and a valve head connected to said valve stem.

4. A valve of the ball cock type having a valve casing comprising an upper cylindrical chamber, a lower cylindrical chamber and an intermediate enlarged chamber, a removable pin extending through said upper cylindrical chamber and substantially to one side of the vertical median thereof, a series of inter-connected levers attached to the upper cylindrical chamber and fulcrumed on said pin, a slotted valve stem movable within the upper cylindrical chamber and detachably secured to said interconnecting levers, and a valve head connected to said valve stem.

5. A valve of the ball cock type having a valve casing comprising an upper cylindrical chamber, a lower cylindrical chamber and an intermediate enlarged chamber having discharge and afterfill chambers, a removable pin extending through said upper cylindrical chamber and substantially to one side of the vertical median thereof, a series of inter-connected levers attached to the upper cylindrical chamber and fulcrumed on said pin, a slotted valve stem movable within the upper cylindrical chamber and detachably secured to said inter-connected levers, and a valve head connected to said valve stem.

6. A valve of the ball cock type having a valve casing comprising an upper cylindrical chamber, a lower cylindrical chamber and an intermediate enlarged chamber having discharge and afterfill chambers, a removable pin extending through said upper cylindrical chamber and substantially to one side of the vertical median thereof, discharge and afterfill pipes extending from said discharge and afterfill chambers, a series of inter-connected levers attached to the upper cylindrical chamber and fulcrumed on said pin, a slotted valve stem movable within the upper cylindrical chamber and detachably secured to said inter-connected levers, and a valve head connected to said valve stem.

7. A valve of the ball cock type having a valve casing comprising an upper cylindrical chamber, a lower cylindrical chamber and an intermediate enlarged chamber having discharge and afterfill chambers, a removable pin extending through said upper cylindrical chamber and substantially to one side of the vertical median thereof, a series of inter-connected levers attached to the upper cylindrical chamber and fulcrumed on said pin, means to regulate the flow of water through said afterfill chamber, a slotted valve stem movable within the upper cylindrical chamber and detachably secured to said inter-connected levers, and a valve head connected to said valve stem.

8. A valve of the ball cock type having a valve casing comprising an upper cylindrical chamber, a lower cylindrical chamber and an intermediate enlarged chamber having discharge and afterfill chambers, a removable pin extending through said upper cylindrical chamber and substantially to one side of the vertical median thereof, a series of inter-connected levers attached to the upper cylindrical chamber and fulcrumed on said pin, a screw threaded valve member in said afterfill chamber to regulate the flow therethrough, a slotted valve stem movable within the upper cylindrical chamber and detachably secured to said inter-connected levers, and a valve head connected to said valve stem.

9. A valve of the ball cock type having a valve casing comprising an upper cylindrical chamber, a lower cylindrical chamber, and an intermediate enlarged chamber having discharge and afterfill chambers, discharge and afterfill pipes extending from said discharge and afterfill chambers respectively, means to silence the flow of water through said discharge pipe, a removable pin extending through said upper cylindrical chamber substantially to one side of the vertical median thereof, a series of inter-connected levers attached to the upper cylindrical chamber and fulcrumed on said pin, a slotted valve stem movable within the upper cylindrical chamber and detachably secured to said inter-connected levers, and a valve head connected to said valve stem.

10. A valve of the ball cock type having a valve casing comprising an upper cylindrical chamber, a lower cylindrical chamber, and an intermediate enlarged chamber having discharge and afterfill chambers, discharge and afterfill pipes extending from said discharge and afterfill chambers respectively, integral lugs within said discharge pipe to silence the flow of water therethrough, a removable pin extending through said upper cylindrical chamber substantially to one side of the vertical median thereof, a series of inter-connected levers attached to the upper cylindrical chamber and fulcrumed on said pin, a slotted valve stem movable within the upper cylindrical chamber and detachably secured to said inter-connected levers, and a valve head connected to said valve stem.

11. A valve of the ball cock type having a valve casing comprising an upper cylindrical chamber, a lower cylindrical chamber and an intermediate enlarged chamber having discharge and afterfill chambers, a screw threaded valve member in said afterfill chamber to regulate the flow of water therethrough, discharge and afterfill pipes extending from said discharge and afterfill chambers respectively, integral lugs within said discharge pipe to silence the flow of water therethrough, a removable pin extending through said upper cylindrical chamber and substantially to one side of the vertical median thereof, a series of inter-connected levers attached to the upper cylindrical chamber and fulcrumed on said pin, a slotted valve stem movable within the upper cylindrical chamber and detachably secured to said inter-connected levers, and a valve head connected to said valve stem.

12. A valve of the ball cock type having a valve casing comprising an upper cylindrical chamber, a lower cylindrical chamber and an intermediate enlarged chamber, a series of inter-connected levers attached to the upper cylindrical chamber and fulcrumed therein, a valve stem movable within the upper cylindrical chamber and slotted to cooperate with said inter-connected levers, and a valve head connected to said valve stem.

13. A valve of the ball cock type having a valve casing comprising an upper cylindrical chamber, a lower cylindrical chamber and an intermediate enlarged chamber, a series of inter-connected levers attached to the upper cylindrical chamber and fulcrumed therein, a valve stem having a guide portion at its upper extremity and a guide portion at its lower extremity movable within the upper cylindrical chamber and slotted to cooperate with said inter-connected levers, and a valve head connected to said valve stem.

14. A valve of the ball cock type having a valve casing comprising an upper cylindrical chamber, a lower cylindrical chamber and an intermediate enlarged chamber, a series of inter-connected levers attached to the upper cylindrical chamber and fulcrumed therein, a valve stem having a guide portion at its upper extremity and a guide portion at its lower extremity movable within the upper cylindrical chamber, said valve stem being offset and having a slot therethrough to cooperate with said inter-connected levers, and a valve head connected to said valve stem.

15. A valve of the ball cock type having a valve casing comprising an upper cylindrical chamber, a lower cylindrical chamber and an intermediate enlarged chamber, a series of inter-connected levers attached to the upper cylindrical chamber and fulcrumed therein, a slotted valve stem movable within the upper cylindrical chamber and detachably secured to said inter-connected levers, and a valve head having a reduced central portion connected to said stem.

16. A valve of the ball cook type having a valve casing comprising an upper cylindrical chamber, a lower cylindrical chamber and an intermediate enlarged chamber, a series of inter-connected levers attached to the upper cylindrical chamber and fulcrumed therein, a slotted valve stem movable within the upper cylindrical chamber and detachably secured to said inter-connected levers, and a valve head connected to said valve stem having a reduced central portion, a cup piston of flexible material at the top thereof, a washer flush therewith at its bottom, and an elongated screw attached thereto.

17. A valve of the ball cock type having a valve casing comprising an upper cylindrical chamber, a lower cylindrical chamber and an intermediate enlarged chamber having discharge and afterfill chambers, a screw threaded valve member in said afterfill chamber to regulate the flow of water therethrough, discharge and afterfill pipes extending from said discharge and afterfill chambers respectively, integral lugs within said discharge pipe to silence the flow of water therethrough, a removable pin extending through said upper cylindrical chamber and substantially to one side of the vertical median thereof, a series of inter-connected levers attached to the upper cylindrical chamber and fulcrumed on said pin, a slotted valve stem movable within the upper cylindrical chamber and detachably secured to said inter-connected levers, and a valve head having a reduced central portion connected to said valve stem.

18. A valve of the ball cock type having a valve casing comprising an upper cylindrical chamber, a lower cylindrical chamber and an intermediate enlarged chamber having discharge and afterfill chambers, a screw threaded valve member in said afterfill chamber to regulate the flow of water therethrough, discharge and afterfill pipes extending from said discharge and afterfill chambers respectively, integral lugs within said discharge pipe to silence the flow of water therethrough, a removable pin extending through said upper cylindrical chamber and substantially to one side of the vertical median thereof, a series of interconnected levers attached to the upper cylindrical chamber and fulcrumed on said pin, a slotted valve stem movable within the upper cylindrical chamber and detachably secured to said inter-connected levers, and a valve head connected to said valve stem having a reduced central portion, a cup piston of flexible material at the top thereof, a washer flush therewith at its bottom, and an elongated screw attached thereto.

19. A valve of the ball cock type having a valve casing comprising an upper cylindrical chamber, a lower cylindrical chamber and an intermediate enlarged chamber having discharge and afterfill chambers, a screw threaded valve member in said afterfill chamber to regulate the flow of water therethrough, discharge and afterfill pipes extending from said discharge and afterfill chambers respectively, integral lugs within said discharge pipe to silence the flow of water therethrough, a removable pin extending through said upper cylindrical chamber and substantially to one side of the vertical median thereof, a series of inter-connected levers attached to the upper cylindrical chamber and fulcrumed on said pin, a valve stem movable within the upper cylindrical chamber and slotted to cooperate with said inter-connected levers, and a valve head connected to said valve stem.

20. A valve of the ball cock type having a valve casing comprising an upper cylindrical chamber, a lower cylindrical chamber and an intermediate enlarged chamber having discharge and afterfill chambers, a screw threaded valve member in said afterfill chamber to regulate the flow of water therethrough, discharge and afterfill pipes extending from said discharge and afterfill chambers respectively, integral lugs within said discharge pipe to silence the flow of water therethrough, a removable pin extending through said upper cylindrical chamber and substantially to one side of the vertical median thereof, a series of inter-connected levers attached to the upper cylindrical chamber and fulcrumed on said pin, a valve stem having a guide portion at its upper extremity and a guide portion at its lower extremity movable within the upper cylindrical chamber and slotted to cooperate with said inter-connected levers, and a valve head connected to said valve stem.

In testimony whereof I have hereunto set may hand.

ROBERT H. MUELLER.